Sept. 16, 1958 J. S. ARNOLD 2,851,876
ULTRASONIC APPARATUS FOR THE NONDESTRUCTIVE
EVALUATION OF STRUCTURAL BONDS
Filed March 11, 1955 5 Sheets-Sheet 2
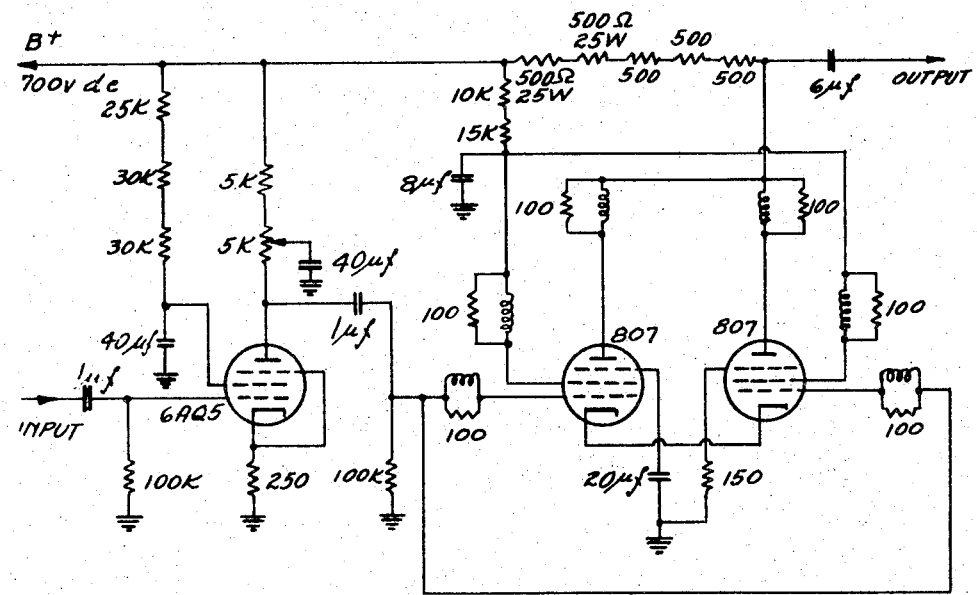
Fig. 3. POWER AMPLIFIER
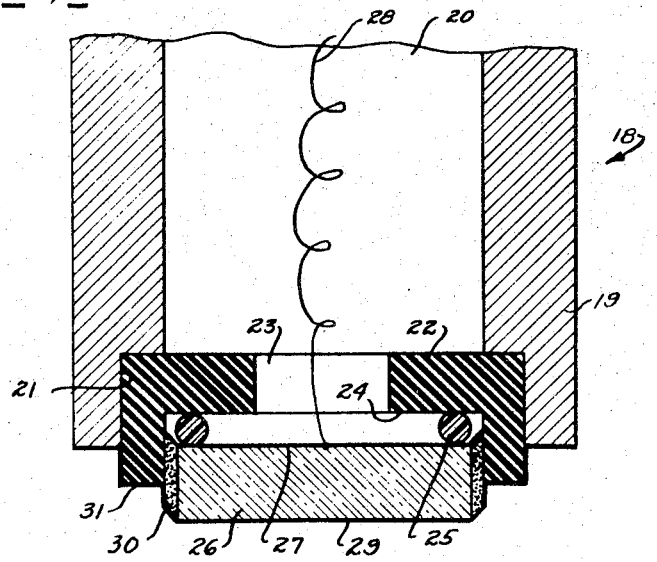
Fig. 4. PROBE
INVENTOR.
JAMES S. ARNOLD
BY Lloyd B. Stevens, Jr.
Wade Koontz
ATTORNEYS Sept. 16, 1958  J. S. ARNOLD  2,851,876
ULTRASONIC APPARATUS FOR THE NONDESTRUCTIVE
EVALUATION OF STRUCTURAL BONDS
Filed March 11, 1955  5 Sheets-Sheet 3

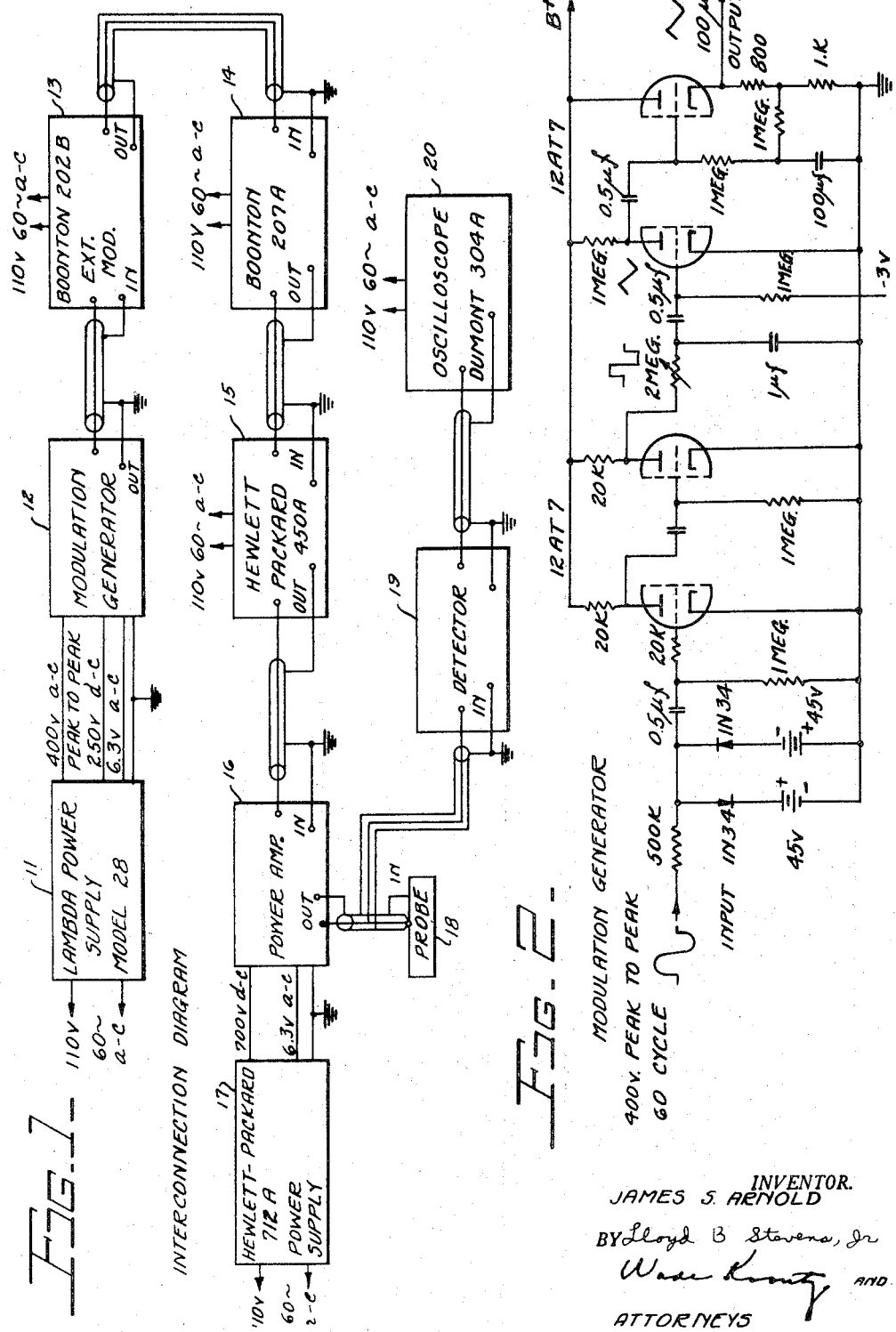

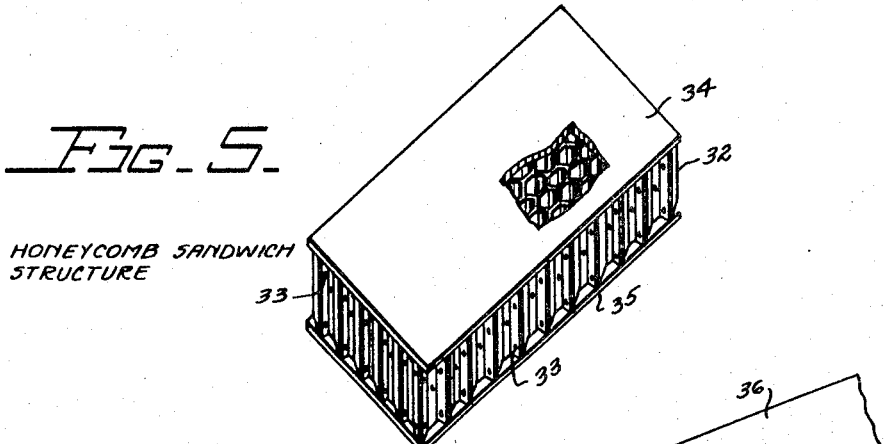

Fig. 5.

HONEYCOMB SANDWICH
STRUCTURE

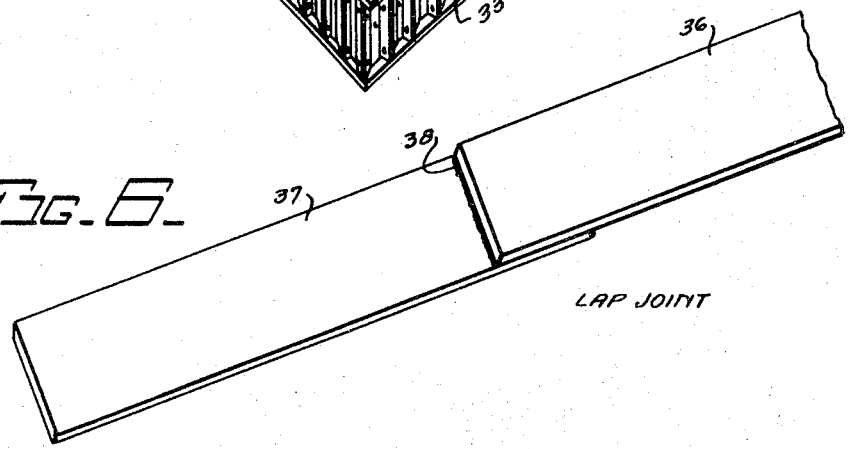

Fig. 6.

LAP JOINT

TYPICAL OSCILLOSCOPE PATTERNS

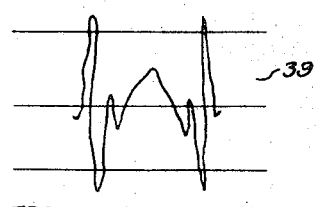

TRANSDUCER ALONE

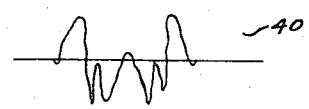

TRANSDUCER OVER
VOID AREA

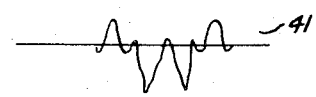

TRANSDUCER OVER
SUBSTANDARD BOND
(LOW PRESSURE CURE)

TRANSDUCER OVER
SATISFACTORY BOND

INVENTOR.
JAMES S. ARNOLD
BY Lloyd B. Stevens, Jr.
Wade Koontz AND
ATTORNEYS

Fig. 7.

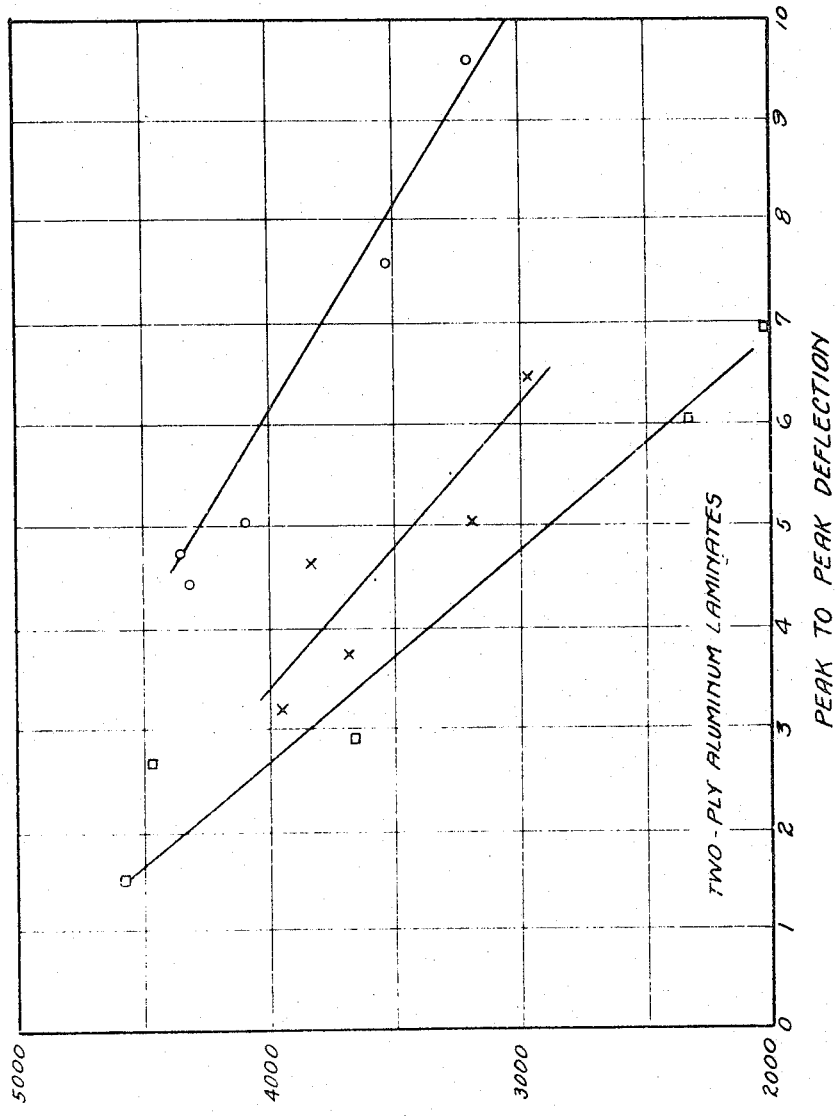

United States Patent Office 2,851,876
Patented Sept. 16, 1958

2,851,876

ULTRASONIC APPARATUS FOR THE NON-DESTRUCTIVE EVALUATION OF STRUCTURAL BONDS

James S. Arnold, Palo Alto, Calif., assignor to the United States of America as represented by the Secretary of the Air Force Application March 11, 1955, Serial No. 493,843

9 Claims. (Cl. 73—67.1)

This invention relates to a device and probe for nondestructively testing structural bonds, particularly structural adhesive bonds in honeycomb sandwich structures used in airplane manufacture.

The use of adhesive in the fabrication of metal and metal-plastic composite structures is a technique that has become very useful in many fields of design and manufacturing, particularly those related to aircraft. Also adhesives have become important in the fabrication of some nonmetal structures, e. g., joining glass cloth skins to glass mat waffle cores. The adhesive bond has unique characteristics that can be important to aircraft designers. Many factors affect the quality of adhesive bonds and a variety of destructive and nondestructive tests have been proposed and used in efforts to measure both qualities. Destructive tests on adhesive bonded samples are widely used. They determine bond quality by destroying the bonds thus making the part unusable. As a result the evaluation of usable bonds is based on statistical and process control variables—a procedure which is quite satisfactory in many applications. There exists, however, applications in which a direct indication of bond strength in usable assemblies is desired, particularly where such bonds are involved in the structural integrity of aircraft, e. g., honeycomb sandwich structure. In these instances the need for a nondestructive method of bond evaluation is obvious.

It is an object of this invention to provide a nondestructive device for testing structural bonds, particularly structural adhesive bonds useful in aircraft structures such as honeycomb sandwich structures.

It is a further object of this invention to provide an ultrasonic power source apparatus usable in a device particularly designed for nondestructively testing honeycomb sandwich structures.

It is an additional object of this invention to provide a piezoelectric transducer probe usable in a device particularly designed for nondestructively testing honeycomb sandwich structures.

These and other objects of the invention will be apparent as the detailed description of the invention proceeds.

The invention will be more clearly understood from the following detailed description of a specific example thereof read in conjunction with the accompanying drawings wherein:

Fig. 1 is a block interconnection diagram of the entire ultrasonic device;

Fig. 2 is a schematic wiring diagram of the modulation generator;

Fig. 3 is a schematic wiring diagram of the power amplifier;

Fig. 4 is a sectional view of a portion of the probe;

Fig. 5 is a perspective view of a honeycomb sandwich structure with a broken out portion;

Fig. 6 is a perspective view of a lap joint;

Fig. 7 is a view of a number of typical oscilloscope patterns obtained while testing a honeycomb sandwich structure with the device;

Fig. 9 is a graph showing the results of a number of tests of aluminum lap joints.

Figure 8:
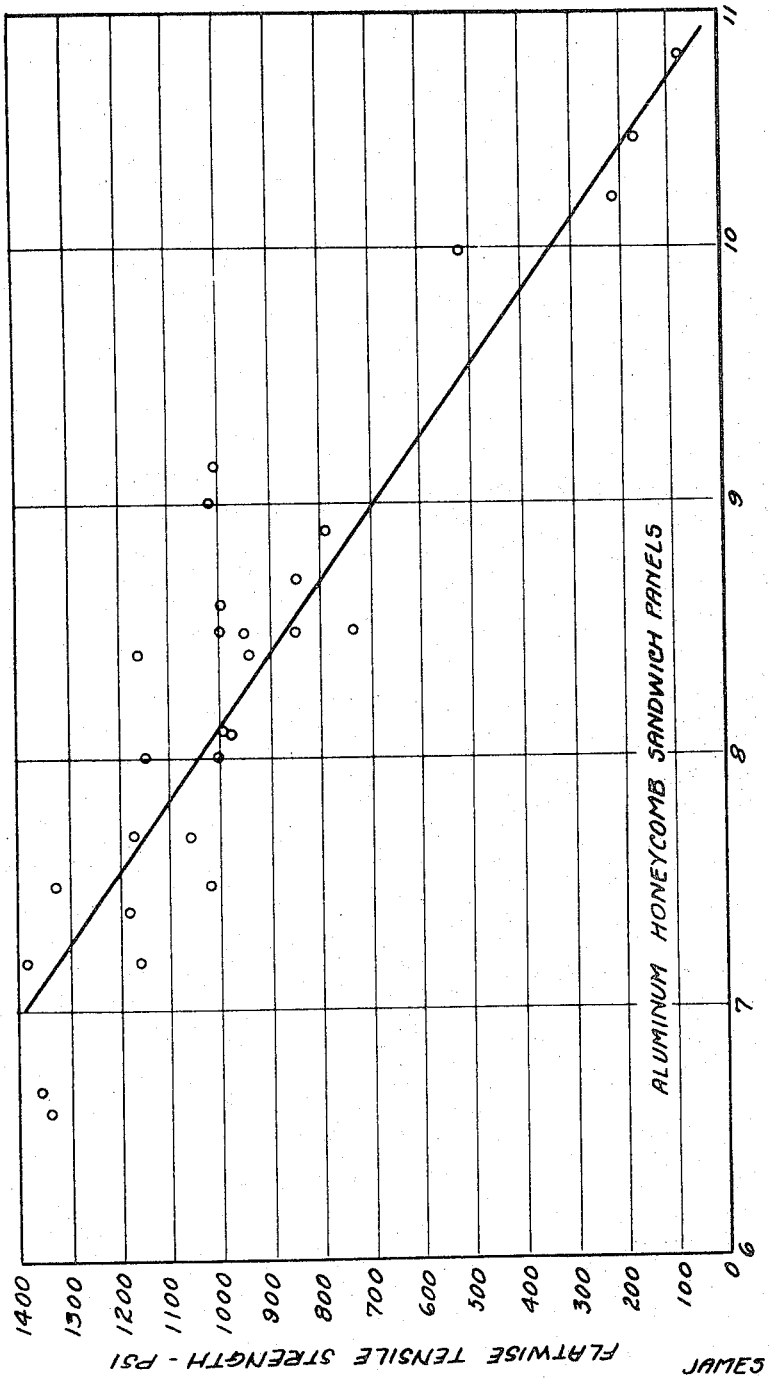
Fig. 8 is a graphical presentation of the results of a number of tests of honeycomb sandwich structures.

In Fig. 1 the modulation generator 12 is shown in block diagram. The power source for the modulation generator is a commercial power supply 11 called Lambda Power Supply, Model 28. 110 v. 60 cycle A.-C. power is fed to power supply 11 which provides 400 v. A.-C., 250 v. D.-C. and 6.3 v. A.-C. power for modulation generator 12. For optimum results it is preferred to use accurately voltage regulated 110 v. 60 cycle A.-C. power wherever used in the device, i. e., at those places indicated in Fig. 1, but this is not absolutely necessary.

The detailed circuit diagram for modulation generator 12 is shown in Fig. 2. In its operation, two biased diodes limit the 400 v. 60 cycle sinusoidal input voltage to form a small square wave voltage. This is amplified by a 2-stage resistance coupled amplifier. A conventional blocking condenser is interposed between the plate of the first stage and the grid of the second stage. The square wave is then integrated by a resistance capacitance network to form a triangular voltage wave. This voltage is amplified and the output taken from a cathode follower. The output voltage is adjustable by varying the charging resistance to the integrating condenser.

A sine wave modulation generator can be used instead of a triangular wave, but the triangular wave generator, which produces a substantially linear modulation voltage, is preferred since it gives a much more sensitive device for the particular use for which the device was made.

The radio frequency (R.-F.) for the device is generated by a two component commercial apparatus, the Boonton 202B–207A combination. In the block diagram of Fig. 1 unit 202B is numbered 13 and unit 207A is numbered 14. 110 v. 60 cycle A.-C. power is provided for each of these units. These units can be used to produce an R.-F. signal in the range of 0.1–218 megacycles. A calibrated output attenuator is provided to regulate the output power level. The signal can be either amplitude or frequency modulated from internal or external sources. In the present circuitry the output of the modulation generator 12 is connected to the external modulation connection of the 202B signal generator. The output of the signal generator is adjusted to produce a frequency modulated signal of the desired deviation and output level, but 150 megacycles higher in frequency than the desired output. This signal is connected to the 207A Univerter input. The Univerter is a unity gain circuit that preserves the modulation and power level characteristics of the input signal but reduces it to the desired frequency. Modulation, coarse frequency, and power controls are on the signal generator and a 5-frequency control is located on the Univerter. Negligible amplitude modulation is present on the output voltage when the frequency modulation characteristic is being utilized as in the present case.

Two amplifiers are used to boost the output of unit 14. The first amplifier 15 is a voltage amplifier and is a commercial unit called the Hewlett-Packard Model 450A amplifier. 110 v. 60 cycle A.-C. power is the power source for this amplifier. The output of this amplifier is fed to power amplifier 16. The circuit diagram for unit 16 is shown in Fig. 3. A commercial power unit 17 which is a Hewlett-Packard 712A power supply is used to supply power to power amplifier 16. 110 v. 60 cycle A.-C. power is the source of power for power supply 17.

Unit 15 is a small self-contained unit with a gain of 20 or 40 db. The amplifier response curve is essentially flat within ½ db in the frequency range of 5 to $10^8$ cycles per second. The signal input for this amplifier is taken from unit 14, and its output is used to drive the final amplifier, unit 16.

The final amplifier 16 is a 2-stage type, with a single pentode (6AQ5) driving a pair of pentodes (807) in parallel. Resistance-capacity coupling is used in input, interstage, and output circuits. RC couplings were employed in order to obtain the greatest linearity over the frequency range of interest. In Fig. 3 a number of 100 ohm resistors in parallel with inductances are shown. These impedance combinations act as parasitic suppressors. This amplifier is essentially flat in frequency response to about 1 megacycle. The flat frequency response is desirable in order to avoid impressing the circuit characteristics upon the power that is applied to the barium titanate transducer. This circuit provides a substantially constant current in the output circuit.

It is possible that a constant voltage source could be used to feed the barium titanate transducer, in which case the transducer current would be the sensitive electrical parameter. Also a constant wattage source might be used; but it is preferred to use a constant current source.

The output of amplifier 16 is fed to probe 18. This power is frequency modulated over a narrow frequency range on both sides of resonance of the resonant frequency of the piezoelectric transducer of the probe, e. g., if a 400 kc. transducer were used modulation could cover a range of about 370–430 kc. Power input to the probe from the power amplifier should be in the range of a milliwatt to several watts with a power of about 0.10 watt being satisfactory for most applications.

As above noted the output of amplifier 16 is frequency modulated in order to cause the transducer assembly 18 to be subjected to progressively varying frequency of oscillation. By thus progressively varying the frequency of oscillation there is imparted to the element being tested a progressively varying mechanical stress or pressure, which mechanical effort will produce readily observable physical changes in the test specimen. While the observer is watching these physical changes he can, at the same time, note the registered frequency at which each successive physical change occurs. Thus the observer, by noting the registered pattern of the applied variable frequencies, may determine precisely the physical behavior of the test specimen at each successive stage of the test. In other words, since each frequency variation signifies a new value in the stress or pressure that is being applied to the test specimen, there will be obtained a series of comparative readings representative of the physical qualities of the material undergoing test. Thus, if the material under test is a "honeycomb sandwich" bounded by a pair of aluminum skins, e. g., the skins shown at 34 and 35 in Fig. 5, a pair of structural rods may be secured to the outer surfaces of the skins, to constitute a "sandwich" structure for insertion into a tensile-strength testing machine equipped with a transducer assembly such as is shown in Fig. 4. As progressively varying frequencies are applied to the transducer, there will result an application of progressively varying tension to the test rods holding the "sandwich" 34, 35. As the sandwich is "stretched" toward the severance point, the successive stresses can be registered on a suitable stress indicator, calibrated to conform to the scale of electrical frequencies successively applied to the transducer assembly 18.

The transducer assembly 18 should be so constructed and installed that its resonant frequency differs from that of the "honeycomb sandwich" or other structure being tested; otherwise its own resonating behavior will be subject to interference from the resonance action of the structure being tested. This would impair the reliability and accuracy of the readings obtained. Accordingly, the invention involves the production of resonating frequencies that lie just beyond (in either direction) the range of resonance of the specimens being tested. Hence the resonant frequency of the transducer assembly 18 should be adjusted to lie in such contiguous range, rather than in the range of the test specimens.

Details of the probe are shown in Fig. 4. Probe 18 consists of a cylindrical brass frame or body 19 which has a cylindrical channel 20 therethrough. Enlarged recess 21 is formed in one end of the body portion as an enlargement of channel 20. A cylindrical polystyrene insulator 22 is positioned in recess 21. This insulator has a cylindrical channel 23 therethrough and a recess 24 as enlargement of channel 23. Insulator 22 is positioned in recess 21 with recess 24 opening outward from the probe. "O-ring" neoprene rubber gasket 25 is positioned in recess 24 of the insulator, and this gasket acts as a flexible cushion for transducer 26. The barium titanate transducer 26 having an inner conductive coating 27 and an outer conductive coating 29 is positioned in recess 24 adjacent gasket 25. If the transducer is used only for testing structures having metal surfaces, e. g., aluminum skin honeycomb sandwich structures, the conductive coating on the lower end of the transducer can be eliminated and the aluminum skin in contact with transducer used instead. The transducer may be held in place within the recess of the insulator by a flexible adhesive 30, such as Minnesota Mining adhesive EC 1120PC. Transducer 26 was installed in recess 24 in this instance by forcing the transducer against "O-ring" 25 to distort it and holding the transducer in this position until adhesive 30 had set. Fig. 4 shows the transducer after the adhesive is set and the force of the transducer against the "O-ring" released. The conductive coating on both ends of the transducer may be made of silver or other suitable electrically conductive material. An electrical connection 28 is made to the inner or upper conductive surface of the transducer. This electrical contact may be a spring loaded connection. The outer or lower conductive film of the transducer is electrically connected to the body or frame 19 of the probe by means of a conducting film 31 across the adhesive and insulator. This film may be made from a conducting paint such as Du Pont silver No. 4317. Several coats of lacquer, e. g., Krylon lacquer, may be applied to conductive coatings 29 and 31 for abrasion resistance.

The driver or transducer converts some of the electrical energy applied into mechanical energy, and transfers it to the test specimen. Transducers having a wide variety of sizes and natural frequencies have been experimented with in a range of frequencies from about 100 to 1300 kc. A one inch diameter, one-fourth inch thick barium titanate transducer having a resonant frequency of about 400 kc. has been used in much of the experimental work. The Brush Electronics Company is a supplier of these barium titanate transducers.

The barium titanate transducer is a preferred type, however, this transducer is a member of a class called ferroelectric transducers which are ceramic materials that require prepolarization in an electric field. Natural piezoelectric materials are also satisfactory for this application, although barium titanate is the preferred type. Other types of piezoelectric transducers such as ammonium dihydrogen phosphate, quartz, ethylene diamine tartrate, dipotassium tartrate, etc. are satisfactory for some uses.

There are at least two other types of electromechanical transducers in addition to piezoelectric transducers which are satisfactory for some applications. These are a modified radio speaker transducer which is normally usable only in the higher audio range of frequencies and a magnetostriction transducer which is usable in the same range of frequency as are piezoelectric transducers. However, the piezoelectric type transducer is the preferred type.

Other types of mountings for the transducer than shown in Fig. 4 may be used. For example, rigid mounting for the transducer as a part of the probe is usable, however, the flexible mounting shown in Fig. 4 is more sensitive.

Detector 19 is a simple diode detector (1N34) with a filter to remove the R.-F. component from the voltage appearing across the probe. A separation of the intelligence-bearing modulation-frequency components from the complex R.-F. voltage developed across the transducer is the function of the detector. The complex signal from the transducer consists of a radio frequency carrier that is amplitude modulated as well as frequency modulated. As indicated above the frequency modulation characteristics are imposed by the signal generators in accordance with the voltage from the modulation generator. The amplitude modulation characteristics are introduced by the barium titanate driver as its electrical impedance varies during the frequency modulation cycle. The changes in electrical impedance are controlled in part by the environment in which the transducer finds itself, and thus by the characteristics of the mechanical load to which it is connected. Adhesive bonds in the test specimen contribute to this load.

The output from detector 19 is applied to an oscilloscope 20, which is a Dumont 304A oscilloscope. The oscilloscope is used to present the information contained in the electrical signal from the probe to the operator. The horizontal sweep generator of the oscilloscope is synchronized by a signal from modulation generator 12.

Peak to peak voltage appearing across the piezoelectric transducer gives significant information concerning the strength of adhesive bonds and this information could be obtained with a vacuum tube voltmeter. However, it is more desirable to use an oscilloscope which shows not only the peak to peak voltage but also the frequency and phase relations of the voltage. If a constant voltage power source or a constant wattage power source were used instead of the constant current power source 16 to drive probe 18, other appropriate measuring apparatus may be used than the detector oscilloscope combination shown in Fig. 1. However, the constant current power source is preferred.

The method in which the apparatus described above or equivalent apparatus can be used to indicate the strength of structural bonds, particularly structural adhesive bonds, will be described in detail below. The structure having bonds to be tested is coupled mechanically to an electromechanical transducer, preferably a piezoelectric transducer. This mechanical coupling can be by holding the transducer against the structure, although normally this type of coupling is not sufficient, and it is preferred to couple the transducer structure through a liquid film which can consist of a thin oil film spread on the structure. Water could be used as the fluid coupling but is not preferred since the water film tends to evaporate with a resultant destruction of the coupling. An adhesive could be used to couple the structure and transducer, but this is not a preferred method since then the transducer cannot be quickly moved over the surface of the structure to examine all bonds or portions of bonds and this adhesive adds another variable to the system which may tend to confuse the information being obtained.

It is preferred to apply frequency modulated power having no substantial amplitude modulation to drive the transducer since elimination of amplitude modulation in this driving power eliminates another variable from consideration. The power may be modulated by a sine wave voltage, but a much more sensitive measurement is obtained if triangular wave voltage, which is a substantially linear modulation voltage, is used. The preferred source of power for driving the transducer is a constant current power source. Constant voltage or constant wattage sources, however, are usable.

In this method it is imperative for maximum effectiveness that a transducer be selected not having a resonant frequency which is the same as the structure being tested. Standing waves resulting from resonating of the structure being tested only tend to mask the information being sought and serve no useful purpose.

The strength of the structural bonds are indicated by appropriate measurements of electrical properties of the transducer. If a constant current power source is used to drive the transducer, measurements indicative of the impedance of the transducer indicate structural strength of the structural bonds. A detector and oscilloscope are the preferred apparatus to show the voltage and frequency pattern across the transducer, and this information is indicative of the strength of the structural bonds. Peak to peak voltage across the transducer is in itself a good indication of the structural bond strength, and this information can be obtained with a vacuum tube voltmeter, although it is preferred to use an oscilloscope to obtain this information.

Fig. 5 shows a typical honeycomb sandwich structure used in airplane construction. The device and method described above were particularly designed to test the adhesive bond strength of this type of structure. The honeycomb portion 32 of the structure consists of a number of hexagonal shaped tubular units of aluminum joined together by adhesives or other suitable means. The covering for this structure is thin aluminum skins 34 and 35 which are bonded to the honeycomb portion by a suitable adhesive. Normally the honeycomb structure contains small openings 33 to allow pressure compensation between the various compartments of the honeycomb portion of the structure. A suitable adhesive for bonding the elements of the core or honeycomb and the skins to the honeycomb is a polyvinyl phenolic adhesive called "FM47" made by the Bloomingdale Rubber Company of Chester, Pennsylvania.

In Fig. 6 is shown a 2-ply aluminum lap joint used in airplane construction. Aluminum plates 36 and 37 are bound together to form the lap joint by a suitable adhesive 38 which may be the same "FM47" adhesive which is described above or other suitable adhesive.

Typical oscilloscope patterns are shown in Fig. 7 in which the device was used to examine honeycomb sandwich panels made of 0.040 inch aluminum skins having 3/16 inch thick hexagonal cell glass fabric cores. This structure was bound together with a 422J adhesive which is an epoxide phenolic adhesive with an aluminum dust filler made by the Shell Development Company, Emeryville, California. Number 39 shows an oscillograph pattern wherein the transducer alone was used. Pattern 40 shows the transducer applied to a structure over a void area. In pattern 41 is shown an oscilloscope pattern where the transducer was used over a substandard bond (low pressure cure). Pattern 42 is an oscilloscope pattern resulting from the transducer being applied over a satisfactory bond.

In Fig. 8 a graph is shown of a number of experiments wherein the device was used to test samples of aluminum honeycomb sandwich panels. After testing with the device, peak to peak oscilloscope deflections being observed, the samples were subjected to conventional flatwise tensile strength testing. This tensile strength test is a destructive test wherein the panel is tested until failure and the point of failure indicated in pounds per square inch. The plot of Fig. 8 shows flatwise tensile strength plotted as the ordinates and peak to peak deflection as the abscissas. A total of 29 specimens of honeycomb sandwich construction was tested to obtain the data for Fig. 8. The skins of the test specimens were 0.016 inch thick, 24ST alclad aluminum, and the honeycomb cores were 0.002 inch aluminum foil honeycomb, the core thickness was 5/8 inch and the specimens were bonded by "FM47" adhesive. The specimens were surveyed by the device by taking peak to peak deflection readings on the oscilloscope at ten random locations on each sample, and averaging. The probe of the device was coupled to the specimens with an oil film. Water could be used as well as oil except that water would tend to evaporate and the film coupling would be lost. The reason for using the oil coupling between the probe and the panel instead of other coupling means is to make it possible to rapidly move the probe from point to point on the panel in surveying the panel. The spread of the reading in Fig. 8 is undoubtedly due in part from the destructive and nondestructive tests being performed on different areas, although the specimens were constructed to have the greatest possible uniformity in each unit.

The correlation of destructive tests and nondestructive tests on a group 2-ply metal laminates or lap joints is shown in Fig. 9. Shear strength in pounds per square inch as the ordinates representing the destructive test is plotted against peak to peak oscilloscope deflections as the abscissas representing the nondestructive tests. These samples were made of two strips of 0.064 inch thick, 24ST alclad aluminum bonded together with "FM47" adhesive. Peak to peak oscilloscope readings were made at three locations on each sample and averaged. Destructive tests were performed at adjacent areas. The three different sets of points in Fig. 9 result from testing three different types of application of the same adhesive to the aluminum plates.

Although the invention has been described in terms of specified apparatus which is set forth in considerable detail, it should be understood that this is by way of illustration only and that the invention is not necessarily limited thereto since alternative embodiments and operating techniques will be apparent to those skilled in the art in view of the disclosure. Although the apparatus was particularly designed to test honeycomb sandwich structure, it can be used to test welds, brazed joints, soldered joints, and in fact any type of structural bond. Also, it is obvious that the apparatus need not consist of so many separate units. The driving power for the transducer including power sources, modulation generator, R.-F. generators, amplifiers, etc., could all be built into a single compact unit, eliminating a number of the nonessential features of the commercial units which were actually used, since these commercial units were obviously not designed for this specific use. Also, the measuring apparatus need not form a part of the basic device since a detector and oscilloscope or vacuum tube voltmeter, or other suitable measuring apparatus in general use may be connected to the transducer for use in this device and disconnected for other use when structural bond strength tests are not being run. The probe itself is of unique design and is most useful in the device for which it was designed, but it might be used with other power sources for other applications. Accordingly, modifications are contemplated which may be made without departing from the spirit of the described invention or the scope of the appended claims.

What is claimed is:

1. A device for testing structural bonds comprising a source of frequency modulated ultrasonic frequency power, an electromechanical transducer driven by said power source, said ultrasonic frequency being frequency modulated cyclically over a narrow band of frequencies outside the resonant frequencies of the structure being tested, and means connected to said transducer to measure an electrical characteristic which is a function of the electrical impedance of the transducer, said measured characteristic being therefore indicative of the strength of the structural bonds being tested.

2. The device of claim 1 wherein said power source is a substantially constant current source when connected in the circuit of said device.

3. The device of claim 2 wherein a detector and an oscilloscope are the means used to measure electrical properties of said transducer.

4. A device for testing structural adhesive bonds comprising a source of frequency modulated power wherein the modulation is cyclic and substantially linear with time, a probe having a barium titantate transducer is driven by said power source, said power source being coupled into the circuit of said device in such a fashion that said source is substantially a constant current source for said transducer and the frequency modulation covers a narrow band of frequencies outside the resonant frequency range of the structure being tested, and means to make measurements indicative of the transducer impedance which is indicative of the strength of structural bonds being tested.

5. The device of claim 4 wherein said measuring means is a detector to remove the carrier component of the voltage appearing across said transducer, and an oscilloscope which is connected to said detector to show the voltage and frequency pattern across said transducer, said oscilloscope being synchronized by a signal from said power source.

6. The device of claim 5 wherein said transducer has a resonant frequency in the range of about 100 kc. to about 1400 kc.

7. A probe useful in a device for nondestructively testing structural adhesive bonds comprising metal tube frame having a recess in one end thereof as an enlargement of the channel thereof, a tubular electrical insulator having an enlarged recess in one end thereof as an enlargement of the channel thereof positioned in the recess of said frame with the recess of said insulator opening outward, a resilient gasket positioned in the recess of said insulator, a piezoelectric transducer movably positioned by means of a resilient adhesive in the recess of said insulator adjacent said gasket, said transducer having an electrically conductive coating on the inner end thereof, and an electrical connection contacting the conductive coating of said transducer.

8. The probe of claim 7 wherein said metal tube is a cylindrical brass tube, said insulator is a cylindrical polystyrene insulator, said gasket is a resilient neoprene rubber gasket of circular cross section, and said transducer is a cylindrical barium titanate transducer.

9. The probe of claim 8 wherein both ends of said transducer are coated with electrically conductive material, and an electrical conductive path between said brass tube and the outer conductive coating of said transducer is formed by a flexible electrically conductive film across said insulator providing for electrical connection to said outer coating by grounding the frame of said probe.

References Cited in the file of this patent

UNITED STATES PATENTS

| | | |
|---|---|---|
| 2,384,716 | Wengel | Sept. 11, 1945 |
| 2,431,233 | Erwin | Nov. 18, 1947 |
| 2,431,234 | Rassweiler et al. | Nov. 18, 1947 |
| 2,494,433 | Erwin | Jan. 10, 1950 |
| 2,514,297 | Smith | July 4, 1950 |
| 2,538,114 | Mason | Jan. 16, 1951 |
| 2,605,633 | Gow | Aug. 5, 1952 |

FOREIGN PATENTS

| | | |
|---|---|---|
| 1,034,171 | France | Apr. 8, 1953 |